(12) United States Patent
Liu et al.

(10) Patent No.: US 8,848,393 B2
(45) Date of Patent: Sep. 30, 2014

(54) ELECTRONIC APPARATUS, POSITIONING ELEMENT AND ELECTRONIC DEVICE FIXING MODULE

(75) Inventors: Chih-Chun Liu, Taipei (TW); Chung-Hong Lin, Taipei (TW)

(73) Assignee: Compal Electronics, Inc., Taipei (TW)

( * ) Notice: Subject to any disclaimer, the term of this patent is extended or adjusted under 35 U.S.C. 154(b) by 211 days.

(21) Appl. No.: 13/327,763

(22) Filed: Dec. 16, 2011

(65) Prior Publication Data

US 2012/0188741 A1   Jul. 26, 2012

Related U.S. Application Data

(60) Provisional application No. 61/434,823, filed on Jan. 20, 2011.

(51) Int. Cl.
*H05K 7/02* (2006.01)
*H05K 7/04* (2006.01)
*G06F 1/16* (2006.01)
*G11B 33/08* (2006.01)
*G11B 33/12* (2006.01)

(52) U.S. Cl.
CPC ............ *G11B 33/124* (2013.01); *G06F 1/1658* (2013.01); *G11B 33/08* (2013.01)
USPC .............................. 361/807; 361/809; 361/810

(58) Field of Classification Search
USPC ............ 361/809, 807, 679.01, 600, 752, 810; 360/97.02
See application file for complete search history.

(56) References Cited

U.S. PATENT DOCUMENTS

| 6,166,901 | A  | * | 12/2000 | Gamble et al. ............ 361/679.34 |
| 6,427,317 | B1 | * | 8/2002  | Choi ............................ 29/603.03 |
| 6,574,118 | B1 | * | 6/2003  | Russell et al. ................ 361/807 |
| 7,215,506 | B2 | * | 5/2007  | Albrecht et al. ............ 360/99.15 |
| 7,345,237 | B2 | * | 3/2008  | Chen et al. ........................ 174/50 |
| 2007/0133122 | A1 | * | 6/2007 | Kim et al. ................... 360/97.01 |
| 2009/0261229 | A1 | * | 10/2009 | Merrow ......................... 248/560 |
| 2010/0123974 | A1 | * | 5/2010 | Marlow et al. ............. 360/97.02 |

FOREIGN PATENT DOCUMENTS

| TW | M248204 | 10/2004 |
| TW | M320830 | 10/2007 |

OTHER PUBLICATIONS

"Office Action of Taiwan Counterpart Application", issued on Mar. 5, 2014, p. 1-p. 9, in which the listed references were cited.

* cited by examiner

*Primary Examiner* — Tuan T Dinh
*Assistant Examiner* — Ahmad D Barnes
(74) *Attorney, Agent, or Firm* — Jianq Chyun IP Office

(57) ABSTRACT

An electronic apparatus includes a housing, an electronic device and an electronic device fixing module. The electronic device includes at least one protrusion. The electronic device fixing module includes at least one fixing structure and at least one positioning element. The fixing structure is integrally connected with the housing. The positioning element is fixed to the fixing structure and contacts the electronic device to prevent movement of the electronic device relative to the housing along a first axis. The positioning element includes a concave portion in which the protrusion is positioned to prevent movements of the electronic device relative to the housing along a second axis and a third axis. The second axis is perpendicular to the first axis. The third axis is perpendicular to the first axis and the second axis. The material of the positioning element is a resilient material. The positioning element is an integrally formed structure.

13 Claims, 5 Drawing Sheets

ELECTRONIC APPARATUS, POSITIONING ELEMENT AND ELECTRONIC DEVICE FIXING MODULE

CROSS-REFERENCE TO RELATED APPLICATION

This application claims the priority benefits of U.S. provisional application Ser. No. 61/434,823, filed on Jan. 20, 2011. The entirety of the above-mentioned patent application is hereby incorporated by reference herein and made a part of this specification.

BACKGROUND OF THE INVENTION

1. Field of the Invention

The present invention relates to an electronic apparatus, a positioning element and an electronic device fixing module, and more particularly, to an electronic apparatus, and a positioning element and an electronic device fixing module of the electronic apparatus that have a vibration-isolating function.

2. Description of Related Art

In addition to the capability of providing the same functions as conventional desktop computers, notebook computers are also designed to have a low profile which makes it easy for the user to carry. Therefore, notebook computers have become an indispensible tool for some users. As the price of the notebook computers continuously goes down, some users even replace their desktop computer with a notebook computer.

In general, a notebook computer contains a hard disk for data storage. The hard disk may be provided with a resilient gasket to avoid damage to the hard disk caused by vibration during carrying or movement of the notebook computer. However, the resilient gasket can only isolate vibration in a single direction. As such, a large number of the resilient gaskets are required to be disposed on the hard disk to achieve a relative perfect vibration-isolating effect. This increases the number of components and is time-consuming in assembly.

SUMMARY OF THE INVENTION

Accordingly, the present invention is directed to an electronic apparatus which includes a positioning element capable of damping forces exerted on an electronic device in multiple directions.

The present invention is also directed to a positioning element capable of damping forces exerted on an electronic device in multiple directions.

The present invention is further directed to an electronic device fixing module which includes a positioning element capable of damping forces exerted on an electronic device in multiple directions.

The present invention provides an electronic apparatus including a housing, an electronic device and an electronic device fixing module. The electronic device includes at least one protrusion. The electronic device fixing module includes at least one fixing structure and at least one positioning element. The fixing structure is integrally connected with the housing. The positioning element is fixed to the fixing structure and contacts the electronic device to prevent movement of the electronic device relative to the housing along a first axis. The positioning element includes a concave portion. The protrusion is positioned in the concave portion to prevent movements of the electronic device relative to the housing along a second axis and a third axis. The second axis is perpendicular to the first axis. The third axis is perpendicular to the first axis and the second axis. The positioning element is an integrally formed structure and is made of a resilient material.

The present invention provides a positioning element fixed to a housing of an electronic apparatus and contacting an electronic device to prevent movement of the electronic device relative to the housing along a first axis. The positioning element includes a concave portion. A protrusion of the electronic device is positioned in the concave portion to prevent movements of the electronic device relative to the housing along a second axis and a third axis. The second axis is perpendicular to the first axis. The third axis is perpendicular to the first axis and the second axis. The positioning element is an integrally formed structure and is made of a resilient material.

In view of the foregoing, in the present invention, the positioning element contacts the electronic device to prevent movement of the electronic device along the first axis, and the protrusion of the electronic device is positioned in the concave portion of the positioning element to prevent movements of the electronic device along the second axis and the third axis, wherein the first axis, the second axis and the third axis are orthogonal to each other. The material of the positioning element is a resilient material. Therefore, the positioning element can damp the external forces exerted on the electronic device along the first axis, second axis and third axis while positioning the electronic device along the first axis, second axis and third axis, thus achieving a perfect vibration-isolating effect.

Other objectives, features and advantages of the present invention will be further understood from the further technological features disclosed by the embodiments of the present invention wherein there are shown and described preferred embodiments of this invention, simply by way of illustration of modes best suited to carry out the invention.

DESCRIPTION OF THE EMBODIMENTS

Figure 1:
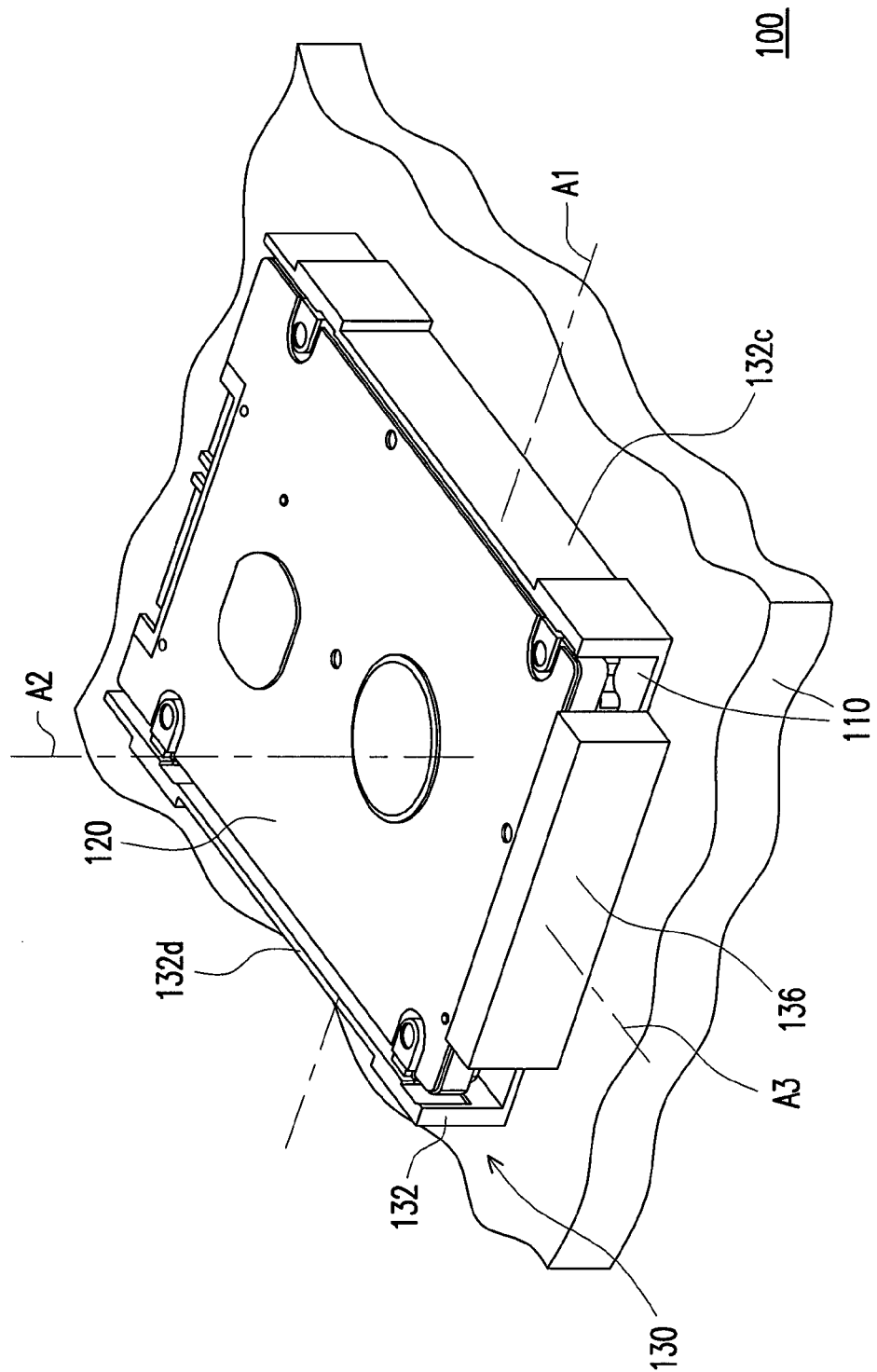
FIG. 1 is a perspective, partial view of an electronic apparatus according to one embodiment of the present invention.
Figure 2:
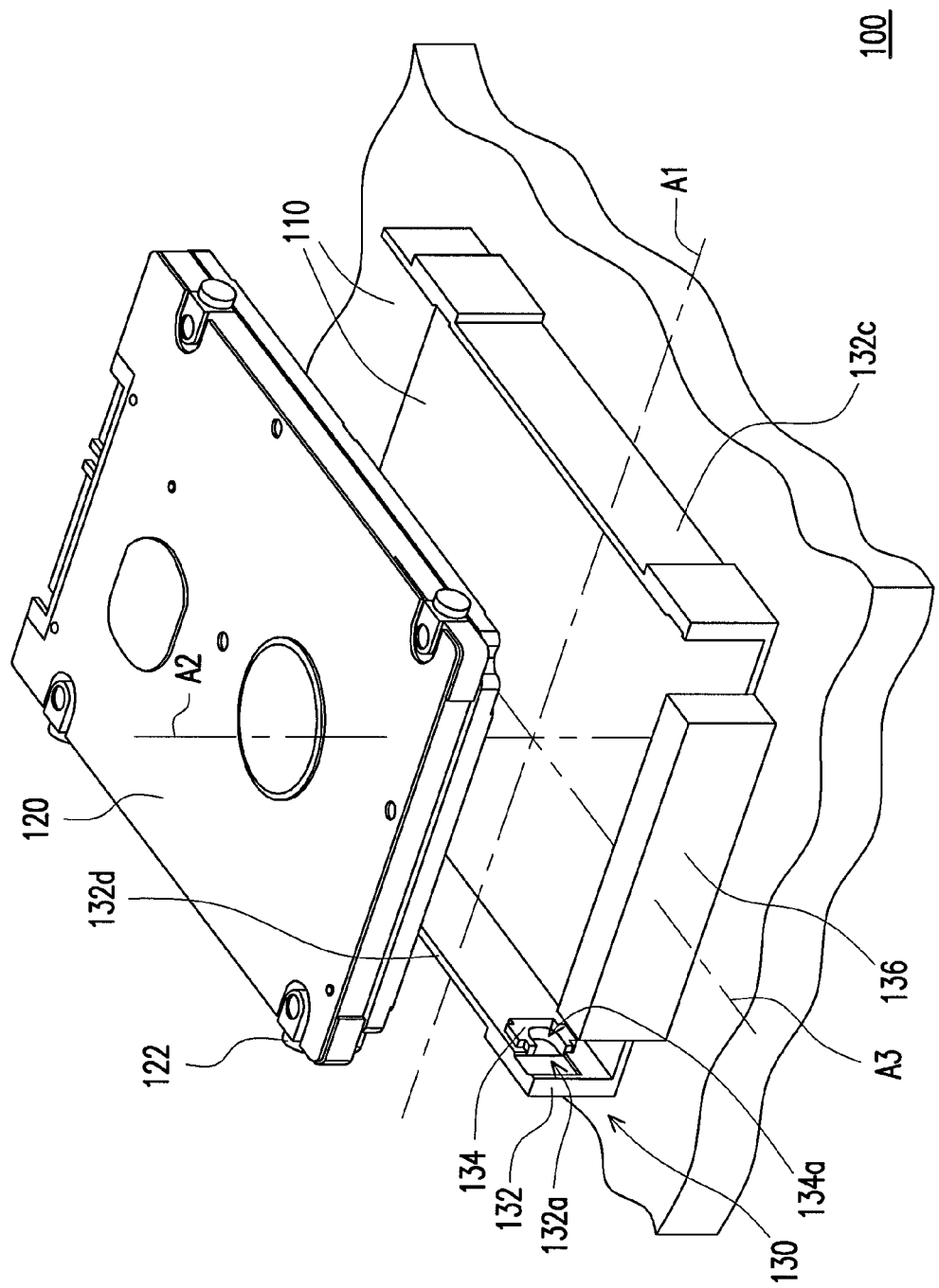
FIG. 2 is an exploded view of the electronic apparatus of FIG. 1.
Figure 3:
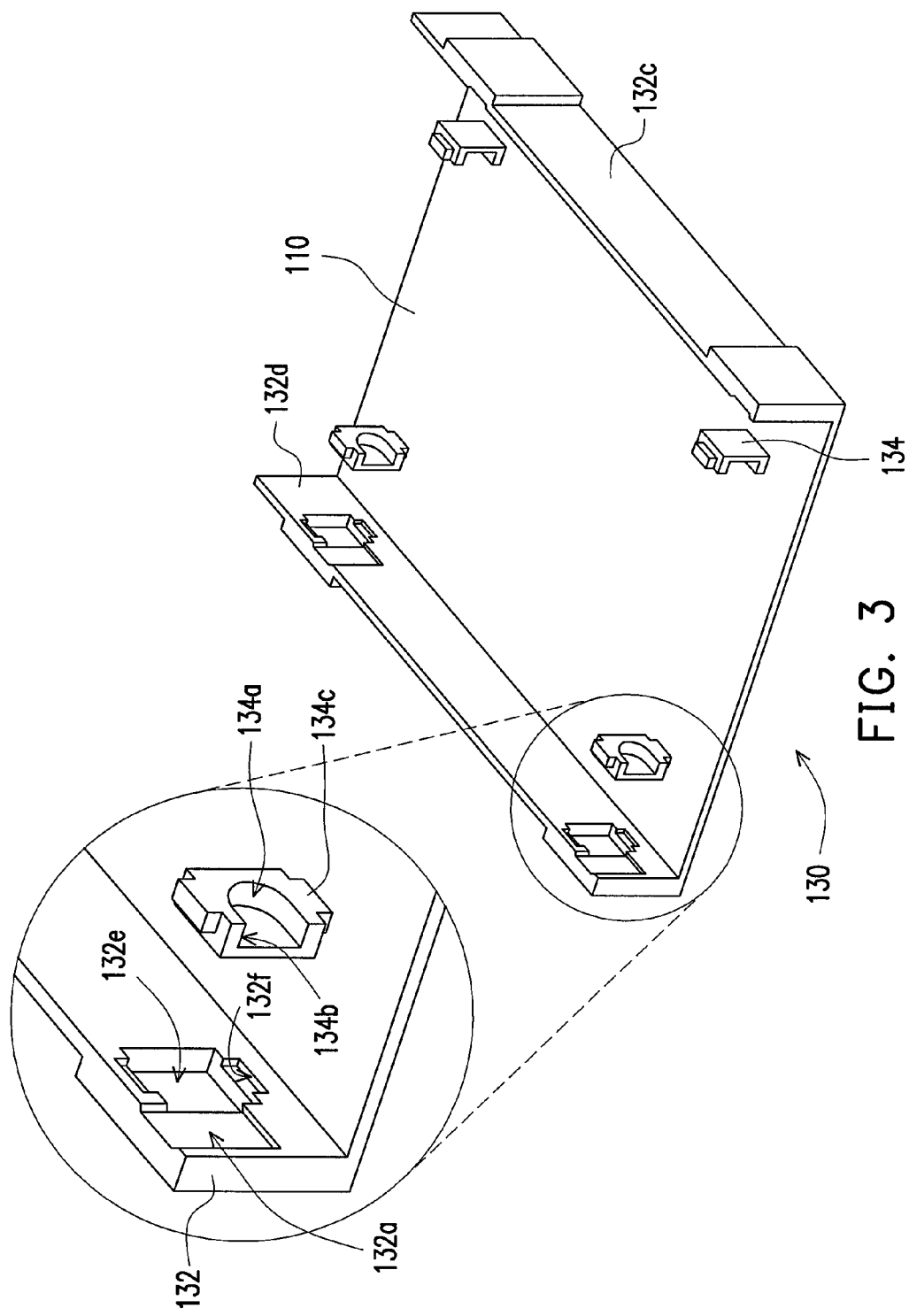
FIG. 3 is an exploded view of parts of the electronic apparatus of FIG. 1.

FIG. 1 is a perspective, partial view of an electronic apparatus according to one embodiment of the present invention. FIG. 2 is an exploded view of the electronic apparatus of FIG. 1. FIG. 3 is an exploded view of parts of the electronic apparatus of FIG. 1. For more clear illustration, all components of FIG. 1 to FIG. 3 are illustrated bottom up. Referring to FIG. 1 to FIG. 3, the electronic apparatus 100 of the present embodiment includes a housing 110, an electronic device 120, and an electronic device fixing module 130. The electronic device 120 includes at least one protrusion 122 (multiple protrusions are illustrated). The electronic device fixing module 130 includes at least one fixing structure 132 (multiple fixing structures are illustrated) and at least one positioning element 134 (multiple positioning elements are illustrated). The material of each positioning element 134 is, for example, rubber or another suitable type of resilient material. Each positioning element 134 is an integrally formed structure. Each fixing structure 132 is integrally connected to the housing 110. The positioning elements 134 are fixed to the fixing structures 132, respectively.

Figure 4:
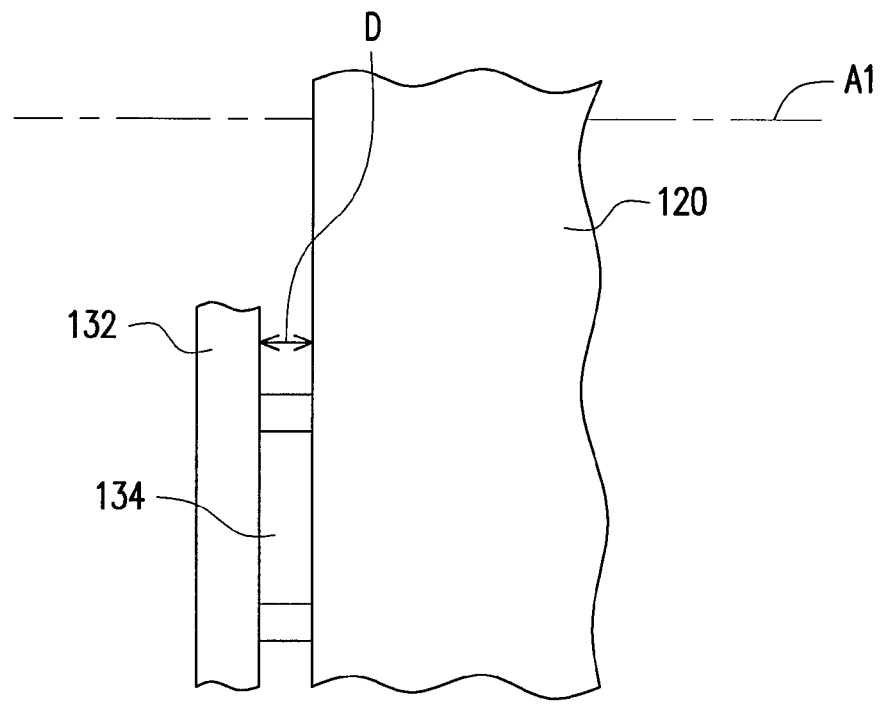
FIG. 4 is a partial view of the electronic device fixing module and the electronic device of FIG. 1.
Figure 5:
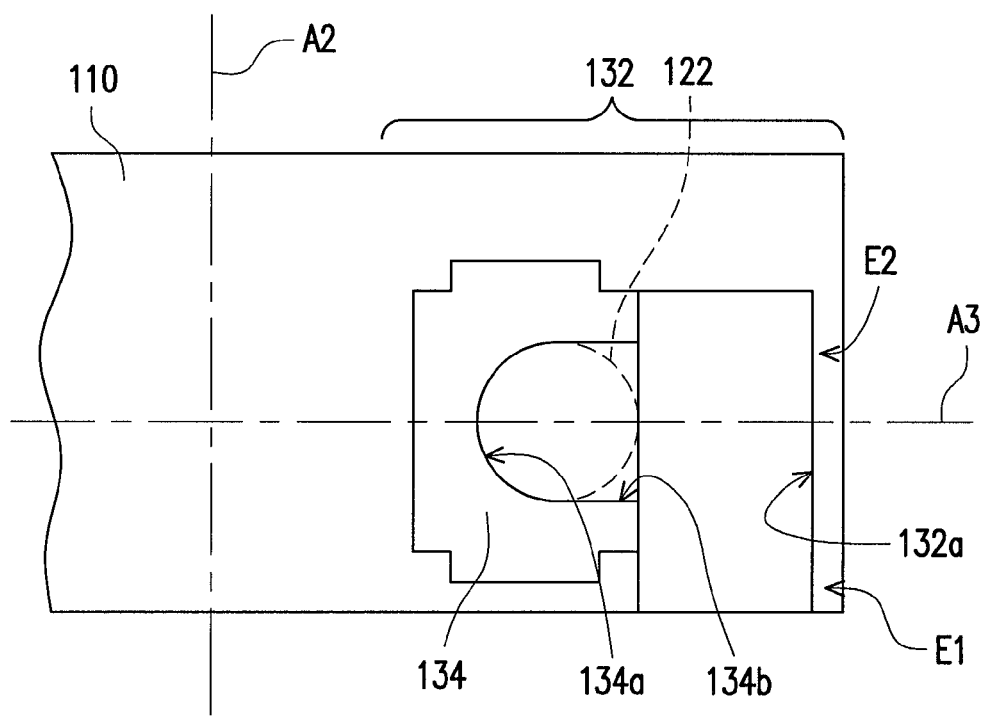
FIG. 5 is a view illustrating one protrusion disposed in the concave portion of FIG. 2.

FIG. 4 is a partial view of the electronic device fixing module and the electronic device of FIG. 1. FIG. 5 is a view illustrating one protrusion disposed in a concave portion of FIG. 2. When the electronic device 120 is disposed within the housing 110 as shown in FIG. 1, the positioning element 134 contacts the electronic device 120 as shown in FIG. 4 to prevent movement of the electronic device 120 relative to the housing 110 along an axis A1. In addition, as shown in FIG. 2 and FIG. 3, each positioning element 134 has a concave portion 134a. When the electronic device 120 is disposed within the housing 110 as shown in FIG. 1, each protrusion 122 is disposed in a corresponding one of the concave portions 134a, as shown in FIG. 5, to prevent movements of the electronic device 120 relative to the housing along an axis A2 and along an axis A3. The axis A2 is perpendicular to the axis A1, and the axis A3 is perpendicular to the axis A1 and the axis A2.

In the above construction, the material of the each positioning element 134 is a resilient material. Therefore, each positioning element 134 can damp external forces exerted on the electronic device 120 along the axis A1, axis A2 and axis A3 while positioning the electronic device 120 along the axis A1, axis A2 and axis A3, thus achieving a perfect vibration-isolating effect.

In the present embodiment, four fixing structure 132, four positioning elements 134 and four protrusions 122 are provided, with two protrusions 122 fixed to one side of the electronic device 120, and the other two protrusions 122 fixed to the other side of the electronic device 120. However, the present invention is not limited to this particular arrangement. In another embodiment, another number of the fixing structures 132, positioning elements 134 and protrusions 122 may be provided. In the present embodiment, the electronic apparatus 100 is, for example, a notebook computer; the electronic device 120 is, for example, a hard disk in the notebook computer; and the housing 110 may include an upper housing portion, a lower housing portion or another housing portion of a host of the notebook computer. In another embodiment, the electronic apparatus 100 may be another type of electronic apparatus, and the electronic device 120 may be another type of hardware device. Thus, the present invention is not intended to limit the electronic apparatus or electronic device to the particulars described herein. In addition, in the present embodiment, each protrusion 122 is, for example, a screw that is threadedly fixed to the electronic device 120. In another embodiment, the protrusion 122 may also be a protruding structure in another form and the present invention is not intended to limit the protrusion to any particular form.

Referring to FIG. 1 to FIG. 3, in the present embodiment, the housing 110 includes a first housing portion 132c and a second housing portion 132d with a distance formed therebetween. Some of the fixing structures 132 are connected to the first housing portion 132c for fixing some of the positioning elements 134 to the first housing portion 132c. The other/remaining fixing structures 132 are connected to the second housing portion 132d for fixing the other/remaining positioning elements 134 to the second housing portion 132d. The positioning elements 134 fixed to the first housing portion 132c face the second housing portion 132d, and positioning elements 134 fixed to the second housing portion 132d face the first housing portion 132c, such that the positioning elements 134 are able to align with the protrusions 122, respectively. In the present embodiment, the first housing portion 132c and the second housing portion 132d are, for example, stop walls at opposite sides of the electronic device 120. However, the present invention is not intended to limit the first housing portion 132c and second housing portion 132d to any particular form. In another embodiment, the first housing portion 132c and the second housing portion 132d may be any suitable portions of the housing of the notebook computer host.

Referring to FIG. 3, in the present embodiment, each fixing structure 132 has a groove 132e, and the positioning element 134 is engaged in the groove 132e so as to be fixed to the housing 110. A thickness of the positioning element 134 is greater than a depth of the groove 132e, such that the positioning element 134 can protrude out of the groove 132e, causing the electronic device 120 and the fixing structure 132 to have a distance D therebetween as shown in FIG. 4 to prevent an external force from being directly transmitted from the fixing structure 132 to the electronic device 120. In addition, the positioning element 134 of the present embodiment includes at least one ear 134c (multiple ears are illustrated), and at least one notch 132f (multiple notches are illustrated) is formed on an inner surface of the groove 132e, with each ear 134c engaged in a corresponding one of the notches 132f to more stably fix the positioning elements 134.

Referring to FIG. 3 and FIG. 5, in the present embodiment, the concave portion 134a extends laterally along the axis A3 to an edge of the positioning element 134 to form an opening 134b. The fixing structure 132 has a guide groove 132a. The guide groove 132a has opposite first end E1 and second end E2, with the second end E2 being adjacent to the opening 134b. The protrusion 122 is adapted to move along the guide groove 132a from the first end E1 to the second end E2, and enter the concave portion 134 along the axis A3 via the opening 134b. When the guide groove 132a is configured to extend along the axis A2 and the first end E1 is disposed below the second end E2 as shown in FIG. 5, the electronic device 120 is adapted to be assembled to the housing 110 in a bottom-to-top direction as the protrusion 122 moves along the guide groove 132a.

The protrusion 122 may move through the opening 134b along the axis A3, causing the electronic device 120 to move therewith. Therefore, as shown in FIG. 1 and FIG. 2, the electronic device fixing module 130 of the present embodiment further includes a stop element 136 for stopping the electronic device 120. The stop element 136 is fixed to the housing 110 and contacts the electronic device 120 to prevent movement of the electronic device 120 relative to the housing 110 along the axis A3 due to the provision of the opening 134b shown in FIG. 5. The material of the stop element 136 is, for example, rubber or another suitable type of resilient material to provide a vibration-isolating effect for the electronic device 120.

Figure 6:
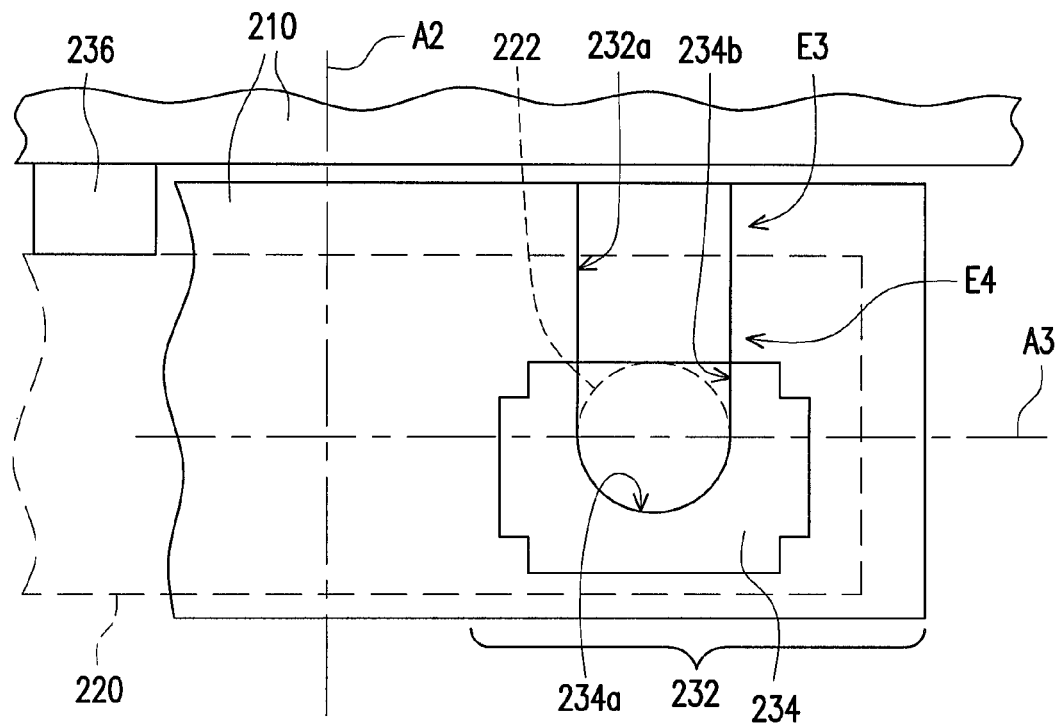
FIG. 6 is a view illustrating one protrusion disposed in the concave portion according to another embodiment of the present invention.

FIG. 6 is a view illustrating the protrusion positioned in the concave portion according to another embodiment of the present invention. Referring to FIG. 6, the concave portion 234a of the present embodiment extends upwardly along the axis A2 to the edge of the positioning element 234 to form an opening 234b, the guide groove 232a is configured to extend in parallel with the axis A2, and a first end E3 of the guide groove 232a is disposed above a second end E4 of the guide groove 232a, with the second end E4 being adjacent to the opening 234b. The protrusion 222 is adapted to move along the guide groove 232a from the first end E3 to the second end E4, and enter the concave portion 234 along the axis A2 via the opening 234b. The electronic device 220 is adapted to be assembled to the housing 210 in a top-to-bottom direction as the protrusion 222 moves along the guide groove 232a.

The protrusion 222 may move through the opening 234b along the axis A2, causing the electronic device 220 to move therewith. Therefore, in the present embodiment, a stop element 236 for stopping the electronic device 120 may be provided on the housing 210. The material of the stop element 236 is, for example, rubber or another suitable type of resilient material to provide a vibration-isolating effect for the electronic device 220. For example, the housing 210 may include an upper housing portion of the notebook computer host, and the stop element 236 is disposed on the upper housing portion to stop movement of the electronic device 220 along the axis A2. In another embodiment, if the electronic device 220 is assembled to the housing 210 in a bottom-to-top direction, the stop element 236 may be disposed on a lower housing portion of the notebook computer host to stop downward movement of the electronic device 220.

Figure 7:
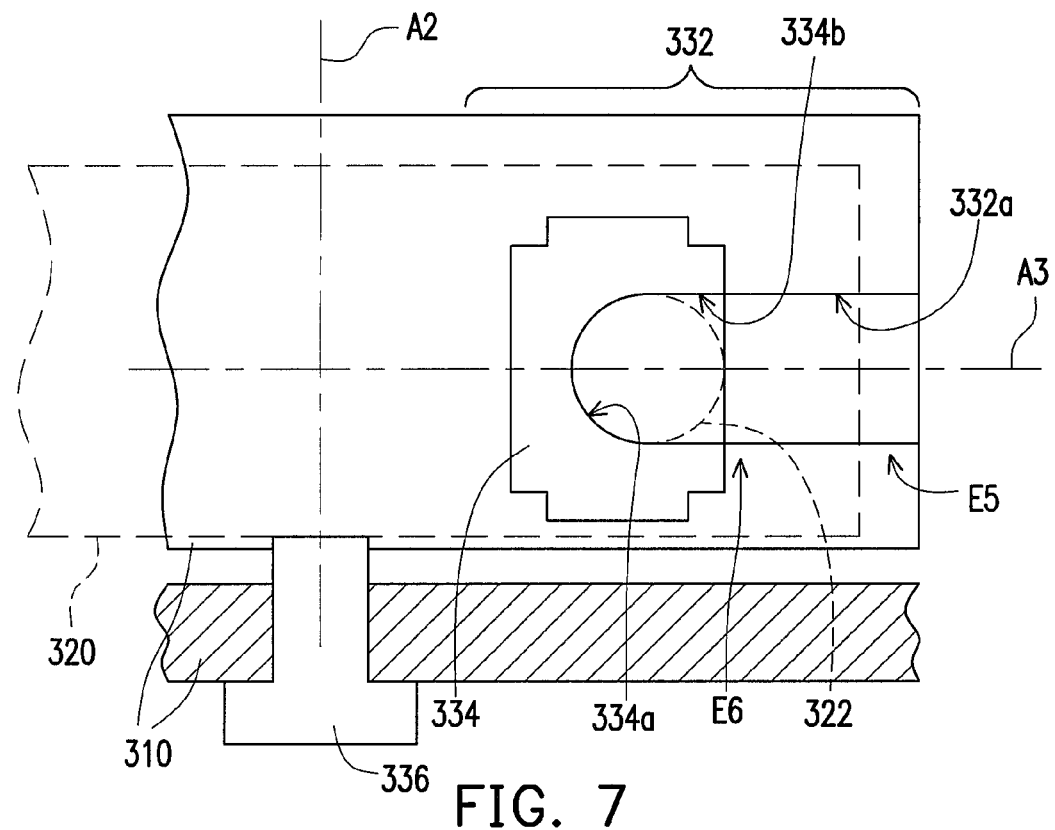
FIG. 7 is a view illustrating one protrusion disposed in the concave portion according to another embodiment of the present invention.

FIG. 7 is a view illustrating the protrusion positioned in the concave portion according to another embodiment of the present invention. Referring to FIG. 7, the concave portion 334a of the present embodiment extends laterally along the axis A3 to the edge of the positioning element 334 to form an opening 334b, the guide groove 332a is configured to extend in parallel with the axis A3, a first end E5 and a second end E6 of the guide groove 332a are disposed at the same height, and the second end E6 is adjacent to the opening 334b. The protrusion 322 is adapted to move along the guide groove 332a from the first end E5 to the second end E6, and enter the concave portion 334 along the axis A3 via the opening 334b. The electronic device 320 is adapted to be assembled to the housing 310 in a side-entry manner as the protrusion 322 moves along the guide groove 332a.

The protrusion 322 may move through the opening 334b along the axis A3, causing the electronic device 320 to move therewith. Therefore, in the present embodiment, a fastener 336 (e.g. a screw) may pass through the housing 310 to position the electronic device 120. For example, the housing 310 may include a lower housing portion of the notebook computer host, and the fastener 336 passes through the lower housing portion to position the electronic device 320 thus preventing movement of the electronic device 320 along the axis A3. In another embodiment, the fastener 336 may also pass through an upper housing portion or another housing portion of the notebook computer host to position the electronic device 320. In addition, the present invention is not intended to limit the number of the fastener 336 to any particular value. Rather, the electronic device 320 may be positioned through multiple fasteners 336.

In summary, in the present embodiment, the positioning element contacts the electronic device to prevent movement of the electronic device along a first axis, and the protrusion of the electronic device is positioned in the concave portion of the positioning element to prevent movements of the electronic device along a second axis and a third axis, wherein the first axis, the second axis and the third axis are orthogonal to each other. The material of the positioning element is a resilient material. Therefore, the positioning element can damp the external forces exerted on the electronic device along the first axis, second axis and third axis while positioning the electronic device along the first axis, second axis and third axis, thus achieving a perfect vibration-isolating effect.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. An electronic apparatus comprising:
a housing;
an electronic device comprising at least one protrusion; and
an electronic device fixing module, comprising:
at least one fixing structure integrally connected with the housing; and
at least one positioning element fixed to the fixing structure and contacting the electronic device to prevent movement of the electronic device along a first axis relative to the housing, wherein the positioning element comprises a concave portion, the protrusion is positioned in the concave portion to prevent movements of the electronic device relative to the housing along a second axis and a third axis, the second axis is perpendicular to the first axis, the third axis is perpendicular to the first axis and the second axis, the positioning element is an integrally formed structure and is made of a resilient material;
wherein the concave portion extends to an edge of the positioning element to form an opening, and the protrusion is adapted to enter the concave portion along the third axis via the opening;
wherein the fixing structure comprises at least one guide groove, the guide groove comprises a first end and a second end, the second end is adjacent to the opening, and the protrusion is adapted to move along the guide groove from the first end to the second end.

2. The electronic apparatus according to claim 1, wherein a distance is formed between the electronic device and the fixing structure.

3. The electronic apparatus according to claim 1, wherein the guide groove extends in parallel with the second axis.

4. The electronic apparatus according to claim 1, wherein the guide groove extends in parallel with the third axis.

5. The electronic apparatus according to claim 1, wherein the electronic device fixing module further comprises a stop element fixed to the housing and contacting the electronic device to prevent movement of the electronic device relative to the housing along the third axis, and the material of the stop element is a resilient material.

6. The electronic apparatus according to claim 1, wherein a number of the at least one fixing structure is more than one, a number of the at least one positioning element is more than one, a number of the at least one protrusion is more than one, some of the protrusions are fixed to one side of the electronic device, and the remaining protrusions are fixed to the other side of the electronic device.

7. The electronic apparatus according to claim 6, wherein the housing comprises: a first housing portion; and a second housing portion positioned at a distance from the first housing portion, wherein some of the fixing structures are connected to the first housing portion for fixing some of the positioning elements to the first housing portion, the remaining fixing structures are connected to the second housing portion for fixing the remaining positioning elements to the second housing portion, the positioning elements fixed to the first housing portion face the second housing portion, and the positioning elements fixed to the second housing portion face the first housing portion.

8. The electronic apparatus according to claim 1, wherein the fixing structure comprises at least one groove and the positioning element is engaged in the groove.

9. The electronic apparatus according to claim 8, wherein a thickness of the positioning element is greater than a depth of the groove.

10. The electronic apparatus according to claim 8, wherein the positioning element comprises at least one ear, at least one notch is formed on an inner surface of the groove, and the ear is engaged in the notch.

11. A positioning element fixed to a housing of an electronic apparatus and contacting an electronic device to prevent movement of the electronic device relative to the housing along a first axis, wherein the positioning element comprises a concave portion, a protrusion of the electronic device is positioned in the concave portion to prevent movements of the electronic device relative to the housing along a second axis and a third axis, the second axis is perpendicular to the first axis, the third axis is perpendicular to the first axis and the second axis, the positioning element is an integrally formed structure and is made of a resilient material;

wherein the concave portion extends to an edge of the positioning element to form an opening, and the protrusion is adapted to enter the concave portion along the third axis via the opening;

wherein a fixing structure is integrally connected with the housing and comprises a groove, and the positioning element is engaged in the groove.

12. The positioning element according to claim 11, wherein a thickness of the positioning element is greater than a depth of the groove.

13. The positioning element according to claim 11, further comprising at least one ear, wherein at least one notch is formed on an inner surface of the groove, and the ear is engaged in the notch.

* * * * *